(12) United States Patent
Kössl

(10) Patent No.: US 7,175,415 B2
(45) Date of Patent: Feb. 13, 2007

(54) MOULDING SYSTEM, IN PARTICULAR A CALIBRATION DIE

(75) Inventor: Reinhold Kössl, Wartberg/Krems (AT)

(73) Assignee: Greiner Extrusionstechnik GmbH, Kremsmünster (AT)

(*) Notice: Subject to any disclaimer, the term of this patent is extended or adjusted under 35 U.S.C. 154(b) by 366 days.

(21) Appl. No.: 10/391,246

(22) Filed: Mar. 18, 2003

(65) Prior Publication Data
US 2003/0219503 A1 Nov. 27, 2003

(30) Foreign Application Priority Data
Mar. 19, 2002 (AT) .................. A 424/2002

(51) Int. Cl.
*B29C 47/16* (2006.01)

(52) U.S. Cl. .................. 425/466; 425/325; 425/326.1; 425/380; 425/381; 425/72.1; 425/71

(58) Field of Classification Search .............. 425/325, 425/326.1, 380, 381, 72.1, 71, 466
See application file for complete search history.

(56) References Cited

U.S. PATENT DOCUMENTS

| | | | | |
|---|---|---|---|---|
| 3,870,453 | A | * | 3/1975 | Howard ...................... 425/465 |
| 3,887,322 | A | * | 6/1975 | Johnson et al. ............. 425/466 |
| 4,029,452 | A | * | 6/1977 | Schippers et al. ............ 425/71 |
| 5,120,212 | A |  | 6/1992 | Reiber et al. |
| 5,626,807 | A |  | 5/1997 | O'Halloran |
| 6,050,800 | A | * | 4/2000 | Chapman et al. ............. 425/71 |
| 6,287,102 | B1 | * | 9/2001 | Franz et al. .................. 425/71 |
| 6,394,782 | B1 | * | 5/2002 | Grassi ........................ 425/384 |
| 6,485,282 | B2 | * | 11/2002 | Wegmaier et al. ............ 425/71 |
| 2002/0054930 | A1 |  | 5/2002 | Wegmaier et al. |
| 2003/0031816 | A1 |  | 2/2003 | Topp |

FOREIGN PATENT DOCUMENTS

| | | |
|---|---|---|
| AT | 003 321 | 1/2000 |
| DE | 198 06 202 | 12/1998 |
| DE | 299 06 109 | 9/1999 |
| EP | 0 990 805 | 10/1998 |
| EP | 0 936 053 | 2/1999 |
| EP | 1 023 983 | 11/2003 |
| WO | WO 01/43939 | 6/2001 |

* cited by examiner

Primary Examiner—Joseph S. Del Sole
Assistant Examiner—Maria Veronica Ewald
(74) Attorney, Agent, or Firm—Collard & Roe, P.C.

(57) ABSTRACT

The invention relates to a moulding system (3), in particular a calibration die (17), for an extrusion plant, with preferably parallel inlet and outlet faces (28, 29) spaced at a distance apart and with side faces (30, 31, 32, 33) extending between them. A longitudinal axis for the object to be fed through a calibration orifice (24) is disposed substantially perpendicular to the inlet and outlet face (28, 29). Provided between a shaping surface (25, 26) and a side face (30, 31, 32, 33) is a gap (37, 38) extending at least across a part of the distance between the inlet and outlet face (28, 29). The gap (37, 38) is disposed between several immediately adjacent parts of several shaping surfaces (26) of the calibration orifice (24) and at least one of the side faces (30, 31, 32, 33). At least the parts of the shaping surfaces (26) co-operating with the gap (37, 38) are displaceable relative to the other shaping surfaces (25).

30 Claims, 8 Drawing Sheets

MOULDING SYSTEM, IN PARTICULAR A CALIBRATION DIE

BACKGROUND OF THE INVENTION

1. Field of the Invention

The invention relates to a moulding system, in particular a calibration die, for an extrusion plant, preferably with mutually spaced inlet and outlet faces disposed parallel with one another and side faces extending between them, in which a longitudinal axis of the object to be fed through a calibration orifice is disposed substantially perpendicular to the inlet and outlet face and a gap extends between a forming surface and a side face, at least over a part of the distance between the inlet and outlet face.

2. The Prior Art

A calibration die consisting of several assembled parts is known from patent document EP 0 990 805 A1 owned by the present applicant, in which individual parts are assembled to make up the calibration die depending on the profiled contour and these individual parts sit with mutually facing separation surfaces in abutment with one another. In order to place the individual parts in mutual alignment with one another, at least one positioning element is disposed between them, by means of which the individual parts can be positioned and re-adjusted relative to one another by varying the distance of the positioning surfaces on the positioning element. To this end and depending on the layout of the separation planes, a displacing motion is generally possible transversely to the direction of extrusion in which the object is fed through. The disadvantage of this approach is that the processing needed to produce the positioning element so that it can be mounted between parts of the calibration die, to enable mutual and individual positioning of the parts of the calibration die, is relatively complex and additional parts also have to be made for the positioning process, resulting in higher costs. Furthermore, it has not always been found possible to obtain satisfactory positioning in all applications.

Short gauges for a cooling and calibration system are known from patent specifications DE 198 06 202 C1 and EP 0 936 053 A1, comprising a calibration plate and at least one recess with a profiled cross-section provided therein and at least one calibration element which partially projects into the recess with the profiled cross-section. The object to be calibrated, in particular a hollow plastics section, is drawn through the profiled recess. At least one locking recess of the profiled cross-sectional recess is provided in the calibration plate, in which the calibration body with its locking element can be inserted. The locking element in turn comprises a lock foot element and a calibration element joined thereto, and a bolt-receiving recess is provided in the lock foot element. The locking element is also provided with another slotted recess. The locking element is retained by inserting it in the locking recess of the calibration plate and fixing on the calibration plate by means of a conical locking bolt element which is inserted in the bolt-receiving recess. The disadvantage of this approach is that the individual parts must be made to a high degree of accuracy in order to ensure perfect positioning and fixing on the calibration plate, and inadvertent loosening of the connection can not be reliably guaranteed in all types of application.

Another calibration plate for the tank of an extrusion tool is known from patent specifications AT 003 321 U1 and DE 299 06 109 U1, which is provided with at least one orifice substantially of the same shape as the profile of the extruded object to enable the extruded object to be guided through the extrusion system and kept in shape. Provided around the circumference of the orifice in the calibration plate, at points where the extruded material slides along the extrusion system, are wear-resistant inserts, which are secured in the calibration plate by means of a press-fit seating, bonded or welded connection or screw connections. The disadvantage of this approach is that it requires a considerable amount work to fix the individual inserts in place and once they have become worn, a considerable amount of effort is involved in replacing them with new inserts.

A calibration plate made up of a plurality of individual parts is known from patent specification U.S. Pat. No. 5,626,807 A, whereby individual parts of the calibration plate, in particular those needed to set up groove-shaped portions of the plastics section, are retained and fixed between the individual plate segments.

SUMMARY OF THE INVENTION

The underlying objective of the present invention is to propose a moulding system, in particular a calibration die, for an extrusion plant, which enables a final adjustment to be made at the calibration orifice for producing the pre-defined shape of the profiled contour of the object rapidly and above all inexpensively without involving a great deal of work.

This objective is achieved due to the fact that a gap is provided at least between several immediately adjacent parts of several shaping surfaces of the calibration orifice and at least one of the side faces and at least the parts of the shaping surfaces co-operating with the gap can be adjusted relative to the other shaping surfaces. The surprising advantage achieved as a result is that several shaping surfaces or parts thereof can always be re-positioned together, in conjunction with one another, thereby enabling a correction to be applied to the calibration orifice with a view to shaping and forming at least certain regions of the object to be fed through. This enables corrections to be made rapidly, in terms of both the angles to be obtained whilst keeping the dimensional stability of the object otherwise virtually unchanged, and corrections to be applied in terms of the spacing. This common re-positioning also enables the complex task of making final adjustments at the individual calibration dies and supporting plates, that would otherwise be necessary, to be considerably reduced, thereby enabling these jobs to be completed in a much shorter time than would usually be the case. Another significant advantage is the fact that when changing the composition of the initial products used to produce the object, the task of adjusting to the final shape of the object at the calibration dies and the support plates can in turn be carried out without requiring complex procedures, which means that re-fitting times are very short, thereby reducing production down-times.

Also of advantage is a moulding system which is made from an integral component, at least in the region of the adjustable shaping surface, since the gap can be produced at given points within the calibration die without complex processing, for example by wire erosion, and the adjustment made by means of the inherent elasticity properties of the material.

Also of advantage is an embodiment of the moulding system in which the gap has a gap width of between 0.1 mm and 15 mm, preferably between 0.25 mm and 0.8 mm, in the direction parallel with the inlet and outlet face, because on the one hand it enables the maximum adjustment path to be obtained and on the other enables its dimension to be fixed in a simple manner.

By virtue of the embodiment of the moulding system in which the gap width of the gap is constant along its longitudinal course prior to re-positioning the shaping surfaces, the extent of the displacement can be specifically fixed at any point of the gap.

In another embodiment of the moulding system in which the gap width of the gap is not constant along its longitudinal course prior to re-positioning the shaping surfaces, an advantage is obtained because individual shaping surfaces can be displaced to differing degrees relative to the stationary shaping surfaces.

Advantages are also be had from another embodiment of the moulding system in which the re-positioned shaping surfaces are held fixed in position once they have been moved into their adjusted position, since it is then possible to respond rapidly and easily to changing operating conditions and make allowance for any dimensional variances, and the shaping surfaces that are held in a fixed position can be rapidly changed to a new position if necessary.

The advantage of the embodiment of the moulding system in which a distance between at least one part-section of one of the re-positioned shaping surfaces can be varied relative to the stationery shaping surface, is that dimensional variances of the object for example in the direction perpendicular to the direction of extrusion, can also be corrected, which significantly reduces the finishing work that would otherwise have to be carried out on the profiled contour of the individual calibration dies.

In another embodiment of the moulding system, the distance may be greater or smaller prior to re-positioning the shaping surfaces than after re-positioning, which means that allowance can be made simply and rapidly for the most varied of possible changes in contour, and the profiled contour in the calibration die can be varied without involving a high degree of additional processing.

Also of advantage is an embodiment of the moulding system in which at least one support element is provided, which projects into the gap in the direction towards the shaping surface in the region of the outlet face, because the forces acting on the part-section of the calibration die can be transmitted to the fixed part thereof without causing sustained damage to the calibration die in the region of the profiled contour.

Another embodiment of the moulding system, in which the supporting element may be recessed in the outlet face, enables a planar design of the calibration die to be obtained, including in the region of the outlet face.

Advantage is also to be had from another embodiment of the moulding system, which is provided with at least one positioning element starting from at least one of the side faces in the direction towards and bridging the gap because, depending on the design of the positioning element, a compression and traction force can be exerted by the positioning element on the portion of the calibration die to be adjusted, thereby enabling a rapid re-positioning of the shaping surfaces to be adjusted.

In another advantageous embodiment of the moulding system, the positioning element is aligned in a direction perpendicular to the gap, which means that a defined adjusting force can be applied, starting from the positioning element, in the defined direction towards the part-section of the calibration die to be re-positioned.

Also of advantage is another embodiment of the moulding system in which a positioning element is provided for each of the oppositely lying shaping surfaces to be adjusted, because this firstly allows the adjustment path to be specifically fixed on one side and the adjusting movement to be effected from the other side.

Additional support of the section of the calibration die to be adjusted on the positioning elements is achieved due to the fact that a recess is provided in one of the shaping surfaces lying close to the gap surface, in which the positioning element can be inserted, or due to the fact that the recess and the positioning element to be inserted in it have a complementary three-dimensional shape, as result of which forces still acting on this part-region can be absorbed by the object in a direction parallel with the direction in which it is fed through.

Another embodiment of the moulding system is possible, in which the gap has a pre-definable gap width in the direction parallel with the inlet and outlet face and in the direction perpendicular thereto and during the re-positioning process, a spacing element can be inserted in the gap being reduced in size to restrict the adjustment, which enables an exact limit to be placed on the adjustment path depending on the thickness of the spacing element in conjunction with the gap width.

The embodiment of the moulding system in which the shaping surfaces are displaced in the direction parallel with the inlet and outlet face reliably prevents jamming, thereby avoiding associated damage to the surface region of the object as it is fed through.

Also of advantage is an embodiment of the moulding system in which part-sections of the shaping surfaces which are displaced relative to the stationary shaping surface are pivoted about a predefined adjustment angle after re-positioning, which enables errors in the angles of the object to be fed through to be corrected rapidly depending on the selected gap and its layout, whilst retaining the section geometry.

Advantage is also to be had from embodiments of the moulding system, in which the gap has at least three linked part-regions, which are essentially aligned at an angle to one another, or the part-regions of the gap have a substantially U-shaped or C-shaped longitudinal extension disposed in a plane parallel with the inlet and outlet face, because this enables the shaping surfaces to be re-positioned together across their entire length or alternatively enables them to be re-positioned across part-lengths only, relative to their angular position.

In another embodiment of the moulding system, an arc is provided as a connecting region between the part-regions of the gap, the advantage of this being that it enables an angular displacement of the part-section of the calibration die to be adjusted, relative to the stationary parts thereof.

The advantage of the embodiment of the shaping device in which the distance between a shaping surface and the part-region of the gap co-operating therewith is substantially constant, is that the portion of the calibration die to be adjusted has virtually identical mechanical strength characteristic values across the part-length of the gap where the distance is substantially constant and thus has substantially constant deformation properties when subjected to an adjustment force.

Advantage is also to be had from another embodiment of the moulding system in which a distance between a shaping surface and the part-region of the gap co-operating therewith varies, because this enables the extent of the desired adjustment to be defined on the basis of a whole range of adjustment paths.

In one embodiment of the moulding system, a distance between a shaping surface and the part-region of the gap co-operating therewith is designed so as to increase constantly, the advantage of which is that as a result of the constant increase in the distance and depending on the extent of the increase, the strength characteristic values can easily be fixed relative to the displacement force applied.

Also of advantage is another embodiment of the moulding system, in which at least one respective gap is provided in the direction towards one of the side faces, starting from at least two shaping surfaces, or the gaps are disposed opposite one another by reference to the calibration orifice, because this enables a common displacement, in particular an enlargement and/or reduction in the profile geometry in the direction perpendicular to the object to be fed through, depending on the choice and direction of the gaps.

As a result of the embodiment of the moulding system in which the gaps are disposed in a same plane, a virtually parallel adjustment of the shaping surfaces relative to one another can be obtained.

Finally, it has also been found to be of advantage to use an embodiment of the moulding system in which at least one receiving orifice is provided in the peripheral region of the calibration orifice, starting from the shaping surface and recessed therein, in which a wear-resistant insert projecting into certain regions of the calibration orifice is placed, because both the insert, in particular the retaining part thereof as well as the receiving orifice respectively co-operating therewith, are respectively surrounded with sleeve surfaces, preferably extending perpendicular to the end faces and aligned parallel with the direction of extrusion, which are simple and inexpensive to make. This likewise affords an accurate guiding system for the insert in the calibration die, which guarantees that the insert will be accurately aligned in its inserted position relative to the calibration die and hence also the object to be fed through. As a result of co-operating limiting stops, which have stop surfaces for the guide arrangement, disposed around the greater part of the peripheral region and in the region of the receiving orifice and on the retaining part, the displacement path is limited, which also provides additional support so that, in conjunction therewith, the force applied by the object lying against the insert is transmitted selectively into the calibration dies. The co-operating stop surfaces are easy to manufacture and guarantee an adequate transmission of forces.

BRIEF DESCRIPTION OF THE DRAWINGS

The invention will be described in more detail below with reference to embodiments illustrated as examples in the appended drawings. Of these.

DETAILED DESCRIPTION OF PREFERRED EMBODIMENTS

Figure 1:
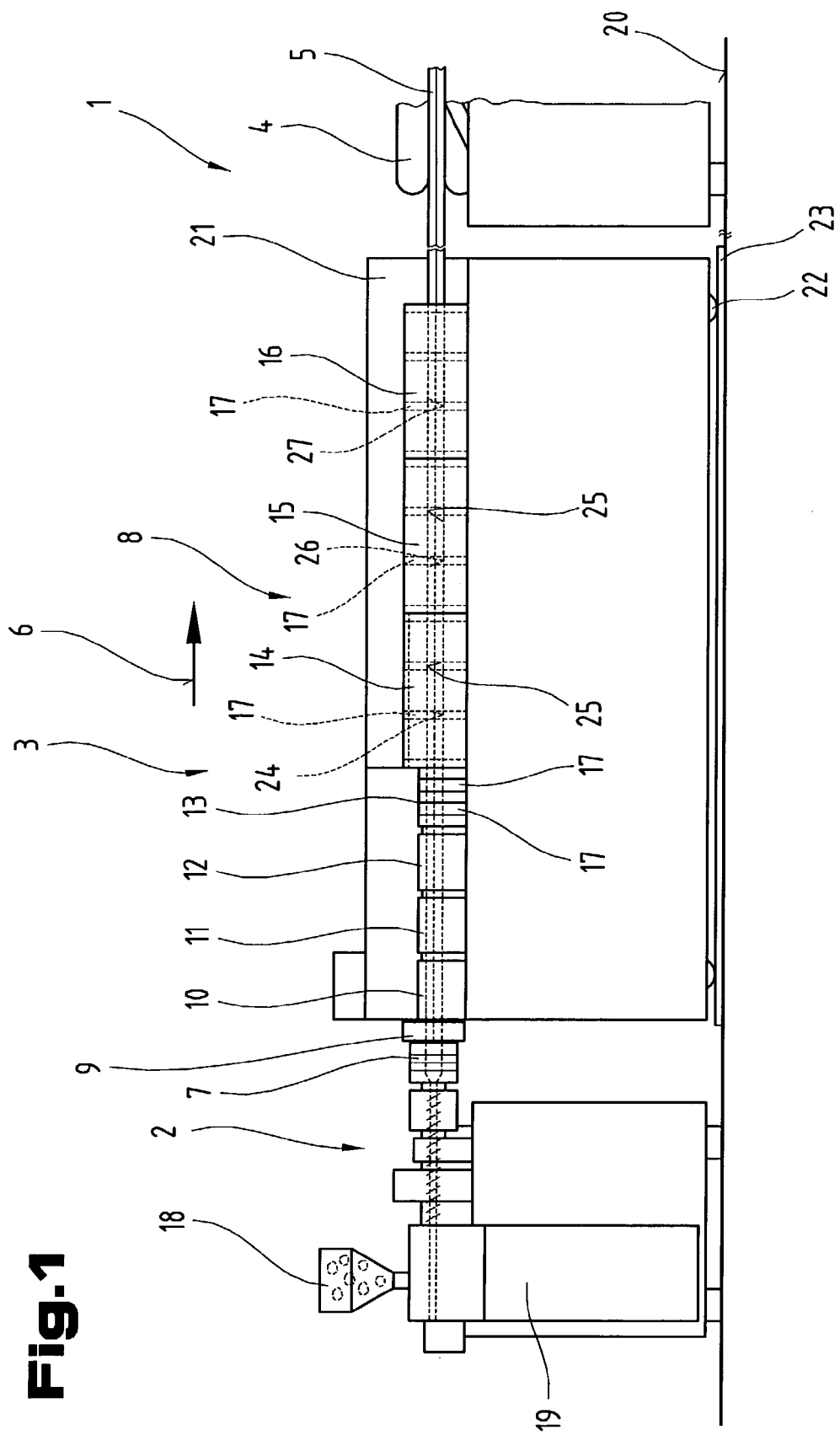
FIG. 1 is a highly simplified, schematic diagram showing a side view of an extrusion plant with a moulding system as proposed by the invention, in particular calibration dies.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 shows an extrusion plant 1, consisting of an extruder 2, a moulding system 3 disposed downstream thereof and a crawler off-take 4 for an extruded object 5 disposed downstream of it. The purpose of the crawler off-take 4 is to draw the object 5, for example a section, in particular a hollow section made from plastics for use in the construction of windows and/or doors, in the direction of extrusion 6, starting from the extruder 2, through the entire moulding system 3. The moulding system 3 in the embodiment described as an example here consists of an extrusion tool 7 co-operating with the extruder 2, a calibration device 8 consisting of at least one but preferably several calibration tools 9 to 13 and at least one but preferably several vacuum pressure tanks 14 to 16, in which several calibration dies 17 are disposed. Individual ones of the calibration dies 17 may be designed in the form of support dies solely to provide a supporting function for the object 5.

Disposed in the region of the extruder 2 is a container 18, in which a supply of material is held, for example a mixture or a granulate for making up a plastics, which is delivered by at least one screw conveyor in the extruder 2 to the extrusion tool 7. The extruder 2 also has a plasticizing unit, which, as the material passes through it, heats and plasticizes the material under pressure, optionally by applying heat, duly imparting to it its inherent properties, as it is conveyed by the screw conveyor, optionally past additional heating system, in the direction of the extrusion tool 7. Before entering the extrusion tool 7, the mass flow of plasticized material is fed through transition zones, where it is shaped to the desired cross-sectional contour.

The extrusion tool 7, the plasticizer unit and the container 18 are supported and retained on a machine bed 19, the machine bed 19 being placed on a flat standing surface 20, such as a flat factory floor, for example.

In the embodiment described as an example here, the entire calibration device 8 is disposed and retained on a calibration table 21, the calibration table 21 being mounted on rollers 22 supported on one or more tracks 23 secured to the standing surface 20. The purpose of mounting the calibration table 21 on rollers 22 on the track 23 is to enable the entire calibration table 21 with the devices and apparatus arranged on it to be moved in the direction of extrusion 6—as indicated by the arrow—from and to the extrusion tool 7. In order to render this displacing motion easier and more accurate, the calibration table 21 is provided with a displacement drive, for example, not illustrated, which permits a selected and controlled longitudinal displacement of the calibration table 21 towards the extruder 2 or away from the extruder 2. Any solutions and units known from the prior art may be used for the drive and for controlling the drive.

The calibration tools 9 to 13 of the calibration device 8 are supported on a mounting plate and are designed as a vacuum calibration system, for example, whereby the extruded object 5 is calibrated inside the individual shaping and calibration tools 9 to 13. The layout of vacuum slots, cooling sections and flow passages and cooling bores as well as their connections and supply may be of any type known from the prior art. Likewise, one or alternatively several of the calibration tools 9 to 13 my be made up of individual calibration dies placed one after the other and immediately adjacent to one another, in the manner described in detail in patent specification AT 003 321 U1. The embodiments and layouts described below for adjusting at least parts of the individual shaping surfaces may literally also be used here and used in various applications.

This calibration process may comprise a combination of dry and wet calibration, for example, or a totally dry calibration only. It may also be operated so that ambient air is totally prevented from penetrating at least between the extrusion tool 7 and the first calibration tool 9 and/or at least between the first calibration tool 9 and other calibration tools 10 to 13. Naturally, however, it would also be possible to allow access for ambient air at least in certain regions between the individual calibration tools 9 to 13 through as far as the object 5 and to provide water baths.

The vacuum pressure tank 14 to 16 has at least one cooling chamber for the object 5 as it leaves the calibration tools 9 to 13, in the form of a housing, illustrated in a very simplified schematic form, the interior of which is divided by the diagrammatically illustrated calibration dies 17 into immediately consecutive regions. In order to disperse heat rapidly from the object 5, the interior of the cooling chamber is at least partially filled with a coolant, which coolant may be either liquid or gaseous. Naturally, however, the same coolant may also be present in the cooling chamber when the unit is in various different states. Furthermore, the pressure in the interior of the cooling chamber may also be reduced to a pressure below atmospheric pressure.

The object 5 emerges from the extrusion tool 7 in a cross-sectional shape determined by the latter, which is then calibrated and/or cooled in the adjoining calibration tools 9 to 13 to the degree that the surface and peripheral regions of the tough plastics object 5 are cool enough for it to remain duly stable in terms of its external shape and its dimensions. After the calibration tools 9 to 13, the object 5 is fed through the vacuum pressure tanks 14 to 16, to provide additional cooling and optionally calibration, as well as to provide support, thereby dispersing any residual heat which the object 5 might still contain.

To operate the extrusion plant 1, in particular the input and output devices disposed on the calibrating table 21, the latter can be connected to a supply system, not illustrated, by means of which a whole range of units can be supplied with a coolant, electrical power, compressed air and placed under vacuum, for example. A whole range of power transmitters may be freely selected and used to suit requirements.

To feed the object 5 through the individual calibration dies 17, the latter have at least one calibration orifice 24 or an aperture, individual shaping surfaces 25, 26 of the calibration orifice 24 bounding or enclosing at least certain regions of an external profiled cross-section 27 of the object 5 to be fed through. As explained above, the object 5 is cooled in the region of its external walls as it passes through the individual calibration tools 9 to 13 so that the softened plastics material solidifies to the degree that the outermost profiled sections of the hollow sections already exhibit a certain inherent stiffness or strength. In order to be able to totally dispel any residual heat which still prevails in the section interior of the object 5, in particular in the region of any hollow compartments and the webs arranged therein, the vacuum pressure tanks 14 to 16 with the calibration dies 17 therein are provided in this particular embodiment.

During the remainder of the cooling and solidifying process, because heat dispersed from the cross-section in differing degrees, internal tensions in the region of the profiled cross-section are eased, as a result of which the object 5 can be guided in such a way at certain points of its cross-section that the required dimensional stability can be obtained to a sufficiently high accuracy, in particular in the region of adjoining regions, sealing grooves, etc. Consequently, high pressure and friction forces occur in the region of such guide and abutment points, starting from the object 5 through to the calibration dies 17, resulting in increased wear at these pre-definable points and, as a further consequence, a dimensional variance which starts to become increasingly more marked. This time lag in the cooling which occurs through the cross-section and the associated setting of the plastics material also causes shifts in the section geometry as a whole, requiring subsequent processing work at individual shaping surfaces 25 and 26 of the calibration orifice 24 in order to guarantee that the dimensions of the object 5 to be produced can be kept to the requisite sizes.

Figure 2:
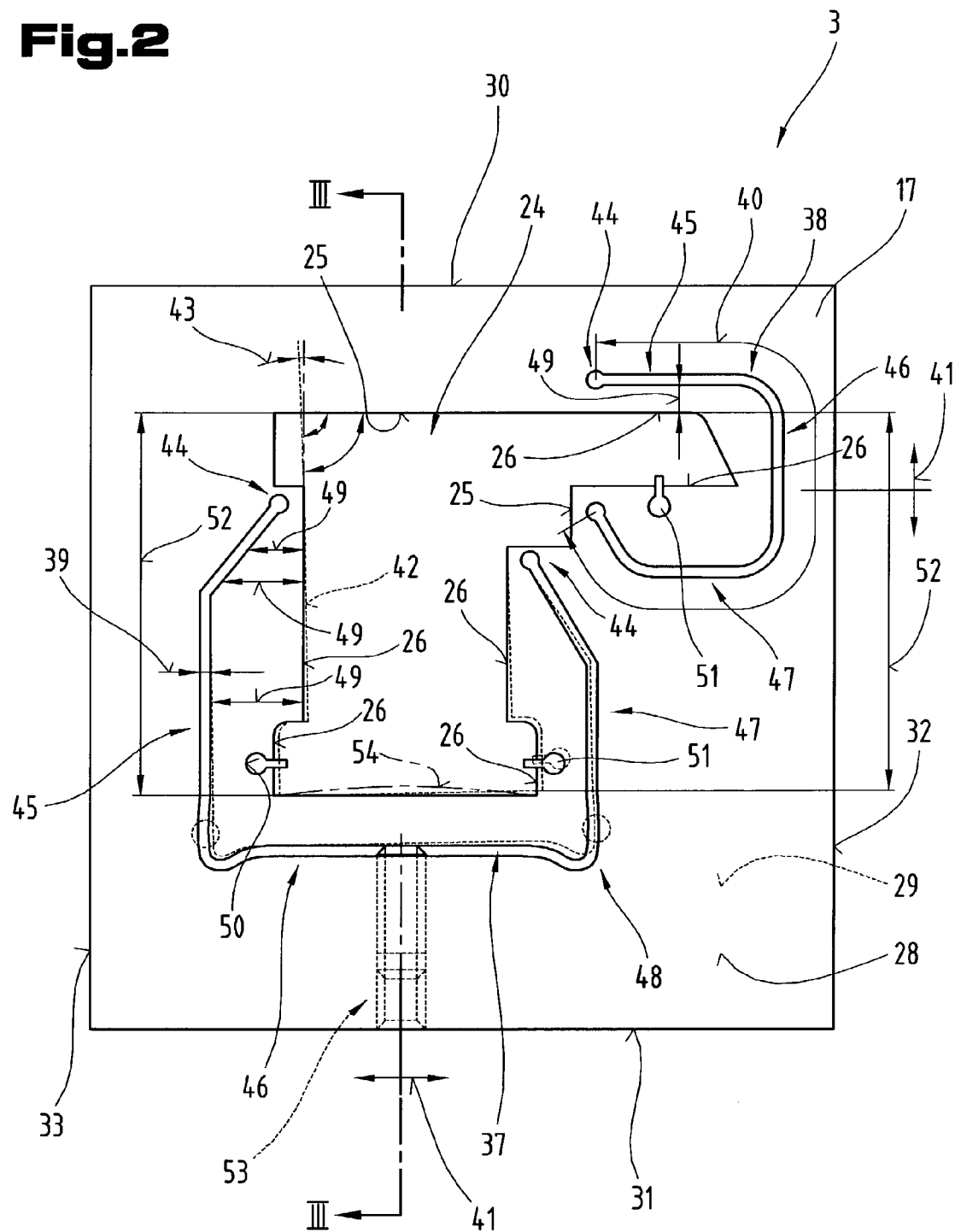
FIG. 2 is a simplified, schematic diagram showing an end-on view of a calibration die for the moulding system, as proposed by the invention.
Figure 3:
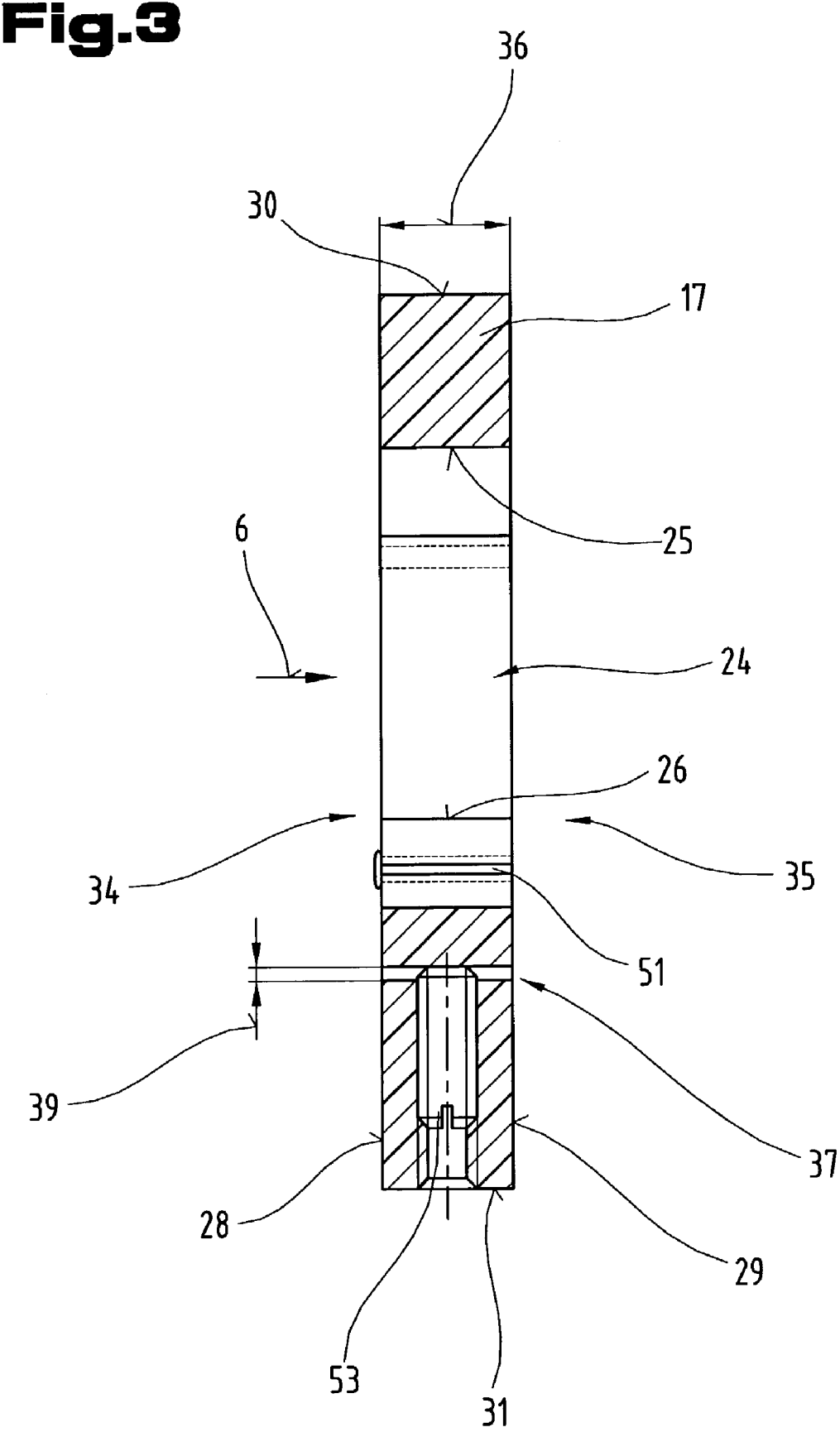
FIG. 3 is a side view of the calibration die illustrated in FIG. 2, seen from a side view along line III—III indicated in FIG. 2.

FIGS. 2 and 3 provide a simplified diagram on an enlarged scale, showing the calibration die 17 with the calibration orifice 24 and the shaping surfaces 25, 26 surrounding it, although, for the sake of simplicity, it should be pointed out that the cross-sectional shape of the calibration orifice 24 was selected for a plurality of possible cross-sectional shapes only.

The calibration die 17 has, spaced apart in the direction of extrusion 6 and preferably aligned parallel with one another, respective inlet and outlet faces 28, 29 as well as side faces 30 to 33 extending between them. This being the case, the inlet face 28 forms an inlet region 34 and the outlet face 29 following it in the feed direction forms an outlet region 35 for the object 5 to be fed through (not illustrated, see FIG. 1). Accordingly, a longitudinal axis for the object 5 to be fed through the calibration orifice 24 is aligned substantially perpendicular to the inlet and outlet faces 28, 29.

As already described with reference to FIG. 1, the calibration dies 17 are preferably spaced at a distance apart from one another in the vacuum pressure tanks 14 to 16 and their thickness 36 between the inlet and outlet faces 28, 29 is between 2 mm and 400 mm, preferably between 5 mm and 20 mm. Accordingly, these calibration dies 17 effectively determine the ultimate set of the external profiled contour of the object 5, in particular the angular alignment and dimensional stability of external surfaces and pockets that will be used for a range of possible inserts, such as seals, etc., for example. As a result of the differentiated easing of internal tensions throughout the profiled cross-section during the cooling process inside the vacuum pressure tanks 14 to 16, there may still be some undesirable shifting of individual parts of the section and it is for this reason that these calibration dies 17 are of crucial importance in terms of the ultimate shaping of the object 5. As a result of these shifts, which are predictable but difficult to define, and the dimensional inaccuracy of the profiled cross-section of the object 5 which occurs as a result, it has been necessary to correct these shifts, for example in the angles of individual shaping surfaces 25, by adding material, accompanied by additional processing that is then needed to correct and remove material from other shaping surfaces 25 in order to obtain the cross-section of the required contour. This has always required complex processing and has always been very time- and cost-intensive.

In order to provide a clearer understanding, shaping surfaces which are stationary relative to the calibration die 17 will always be denoted by reference number 25 and shaping surfaces that are displaceable relative to this stationary shaping surface 25 will always be referred to by reference number 26 in the description of the individual drawings given below.

The embodiment illustrated in FIG. 2 as an example provides a simple illustration of one of many different possibilities for a calibration orifice 24, whereby several shaping surfaces 26 of the calibration orifice 24 can be re-positioned together and in conjunction with one another, for two different profiled portions of the object 5, relative to at least one other stationary shaping surface 25 of the same calibration orifice 24. In this instance, the shaping surfaces 26 to be re-positioned are provided with a gap 37, 38, between themselves and the side faces 30 to 33—in this particular embodiment side faces 31 to 33—adjacent to them and delimiting the calibration die 17, extending from the inlet face 28 to the outlet face 29. The gap 37, 38 extends continuously, adjacent to the shaping surfaces 26 to be adjusted, and has a gap width 39 in the direction parallel with the inlet and outlet face 28, 29 of between 0.1 mm and 15 mm, preferably between 0.25 mm and 0.8 mm. The gap width 39 depends on the extent of the relative displacement in the shaping surfaces 26 to be re-positioned by reference to the stationary shaping surface 25. It has been found to be of particular advantage if the gap width 39 of the gap 37 or 38 is designed so as to be continuously constant across its longitudinal course 40 prior to re-positioning the shaping surfaces 26. Depending on the type of method used to produce the gap 37 and 38, however, the gap width 39 may also be selected so that it is not constant across its longitudinal course 40 prior to re-positioning the shaping surfaces 26. Furthermore, as illustrated on an even more simplified basis, that portion of the calibration orifice 24 with the shaping surfaces 26 assigned to the side faces 31 or 32 and 33, assumes a position indicated by broken lines after having been re-positioned in the direction of a double arrow 41, these re-positioned shaping surfaces being denoted by reference number 42.

The essential factor is that the gap 37, 38 is provided at least between several parts or longitudinal portions of several shaping surfaces 26 of the calibration orifice 24 immediately adjacent to one another and at least one of the side faces 30, 31, 32, 33, and at least the parts or longitudinal portions of the shaping surfaces 26 co-operating with the gap 37, 38 are displaceable relative to the other shaping surfaces 25.

The degree of adjustment, which in the case of the specific embodiment described here is an angular adjustment, may be obtained using various different possible arrangements of the gap 37 or 38 by reference to the shaping surfaces 26 to be adjusted as well as the choice of gap width 39, as described below. When the shaping surfaces 26 to be adjusted are fixed in their new position relative to the stationary shaping surface 25, they must be retained in their adjusted position relative to the stationary shaping surface 25. This may be achieved, for example, due to the fact that the displaceable portions and parts of the calibration die 17 are retained with those on the oppositely lying side of the gap 37, 38 and relative to these fixed parts of the calibration die 17 such that they can be released as and when necessary, by means of a fixing device, for example a welded joint—as illustrated in a simplified manner in FIG. 2 by a circle of broken lines—of a connecting element, such as bolts, wedging pins, screws, wedges, rivets or similar. However, it would also be possible to use soldered or bonded connections in a varied range of embodiments. Alternatively, it would also be possible to obtain a clamping action by a screwing means and fix the position in this manner. Another option is to use conical threading, such as NPT threads, for example, offset in a whole range of different eccentric pitches, and, optionally, remotely operable adjusting means so that the process of adjusting the position of the shaping surfaces 26 to be re-positioned can be semi- or fully automated. These means mentioned above may be used solely for the purpose of positional adjustments or alternatively in any combination both for obtaining a shift in position and/or as a fixing means.

If it is necessary to make a first correction to the position of the shaping surfaces 26 to be adjusted relative to the stationary shaping surfaces 25, this fixing device is released, for example by grinding the welded joint or joints, and a new relative shift in position is undertaken and this is in turn held fixed, positioned in the desired end position. Accordingly, the position of individual shaping surfaces can be changed frequently without the need for any subsequent processing, and shaping surfaces 26 to be adjusted are displaced in the direction parallel with the inlet face 28 and the outlet face 29.

Another possible layout is illustrated, in which the gap 38 is disposed in the part of the calibration orifice 24 which is directed towards the side faces 30, 21 of the calibration die 17. In profiled parts of an object 5 of this type, which project out from the main profile, it is often necessary to make an angular correction, which can again be made in the direction parallel with the inlet face 28 and the outlet face 29, as indicated by double arrow 41. The fixed positioning by reference to the stationary shaping surface 25, can be secured in the manner described above, once the shaping surfaces 26 to be adjusted have been re-positioned.

As may also be seen from the embodiment illustrated as an example in FIG. 2, the shaping surface 26 to be shifted, associated with the side faces 33, is pivoted about a pre-defined displacement angle 43 by reference to the stationary shaping surface towards the shaping surface 42, indicated by broken lines, after re-positioning. The shaping surface 26 to be adjusted is therefore disposed at a right-angle to the stationary shaping surface 25, for example, so that after re-positioning, the adjusted shaping surface 42 subtends an angle with the stationary shaping surface 25 that is smaller than the right-angle, calculated on the basis of the difference between it and the displacement angle 43.

The requisite displacement angle 43 may be determined on the basis of the starting point 44 of the gap 37, 38 by reference to the shaping surface 26 to be adjusted and the difference between the gap 37 and the shaping surface 26 co-operating therewith which is to repositioned.

In terms of strength, the starting point 44 may be selected by reference to the shaping surface 25, 26 in such a way that individual part-portions of the calibration orifice 24 can be displaced on the one hand and a sufficient strength is still achieved, on the other hand, to prevent any separation and hence any damage to the displaceable portions of the calibration die 17.

Looking now at the longitudinal course 40 of the gaps 37, 38 illustrated in FIG. 2, these are made up of at least three connecting part-regions 45 to 47, essentially disposed at an angle to one another. Moreover, the part-regions 45 to 47 of the gap 37, 38 may also follow a substantially U-shaped or C-shaped longitudinal course 40 in a plane parallel with the inlet and outlet faces 28 and 29. The connecting region 48 between the individual part-regions 45 to 47 of the gap 37, 38 may be provided in the form of an arc, for example. Naturally, it would also be possible to design this connecting region with any three-dimensional shape, provided care is taken to ensure that those parts of the calibration die incorporating the shaping surfaces 26 to be adjusted can be displaced unhindered. The starting points 44 and the extent of the displacement are selected so that there will usually be some elastic deformation in the material of the calibration die 17 in the region disposed between the shaping surface 25 and the starting point 44, and the material of the calibration die 17 may naturally also be subject to an elastic deformation in the event of bigger displacements.

Turning to the longitudinal course 40 of the gap 37, starting from the starting point 44 associated with the side faces 33, a distance 49 between the shaping surface 26 and the part-region 45 of the gap 37 associated therewith is designed so that it constantly increases. For the remainder of the longitudinal course 40, the distance 49 between the shaping surface 26 and the associated part-region 45 of the gap 37 then remains substantially constant. The gap 37 therefore extends more or less parallel with the shaping surface 26 prior to re-positioning. By changing the distance 49 to the associated part-regions 45 to 47 of the gap 37, 38 a different deformation behaviour is obtained in the part-sections of the calibration die 17 to be re-positioned.

Likewise, the longitudinal extension 40 of the gap 37, starting from the other starting point 44 of the same gap 37 in the region of the shaping surface 26 associated with the side faces 32 is selected with the same profiled part or calibration orifice 24. The displacement behaviour of the shaping surface 26 to be re-positioned can be varied by depending on the extent or height of the increase in the distance 49, from the starting point 44 by reference to the shaping surface 26. The more rapidly the distance 49 increases, the more rapidly the strength of the portion of the calibration die 17 to be re-positioned increases, which quickly results in an angular change almost in the form of a bend in the shaping surface 26 to be re-positioned, the remaining longitudinal course of the shaping surface 26 remaining more or less rectilinear. The greater the distance 49 between the shaping surface 26 to be re-positioned and the gap 37, 38, the greater the strength of the part-portion of the calibration die 17 to be re-positioned, and for the most part only an angular displacement of the shaping surfaces 26 occurs in the region of the starting point 44 by reference to the stationary shaping surface 25.

If we now look at the part-portion 45 of the other gap 38 in the region of the side face 30, on the other hand, the distance 49 is selected so as to be substantially constant relative to the shaping surface 26 so that when the shaping surface 26 is displaced, it has a curved, in particular, arcuate contour as viewed looking onto the inlet and outlet faces 28, 29.

As also illustrated, in the peripheral region of the calibration orifice 24, at least one receiving orifice 50 is provided, starting from the shaping surface 25 or 26 and recessed therein, in which a wear-resistant insert 51 is inserted, projecting into the calibration orifice 24 in certain regions. The design of the insert 51 and the manner in which it is placed in the calibration die 17 may be as described in AT 004 440 U1, and for the sake of avoiding unnecessary repetition, the disclosures contained in this utility model are included here by way of reference.

The essential factor about the layout of the gap 37, 38 relative to the shaping surfaces 26 is that, depending on the desired displacement, a distance 52 between at least one part-portion of one of the re-positioned shaping surfaces 42 is such that it can be varied relative to the stationary shaping surface 25. This being the case, the distance 52 may be bigger and/or smaller after the shaping surface 26 has been re-positioned than before re-positioning.

In addition to the angular shift in the shaping surfaces 26, it may also be of advantage if at least one of the shaping surfaces 25, 26 can be varied in terms of its longitudinal contour. This might be the case if, for example, an external surface of the object 5 to be produced is of a planar design but has an outward camber in cross-section. A correction may then be made if the relevant shaping surface 26—in this particular case the shaping surface 26 assigned to the part-region 46 of the gap 37—is provided with a positioning element 53. This positioning element 53 may be provided in the form of a threaded spindle or worm screw, a compression element, etc., for example, which can be screwed into a complementary thread, extending from the side face 31 in the direction of the oppositely lying side face 30. The end of the positioning element 53, directed towards the gap 37, bridges the latter and exerts a force accordingly on the part-portion of the calibration die 17 remote from the side face 31, depending on the displacement path or screwing depth, and deforms the shaping surface 26, as indicated in a simplified manner by the broken lines, thus producing a cambered shaping surface 54. Depending on requirements, it would also be possible provide the respective shaping surfaces 26 to be adjusted with various positioning elements 53, in which case several of these positioning elements 53 could also be assigned to the same shaping surface 26.

Figure 4:
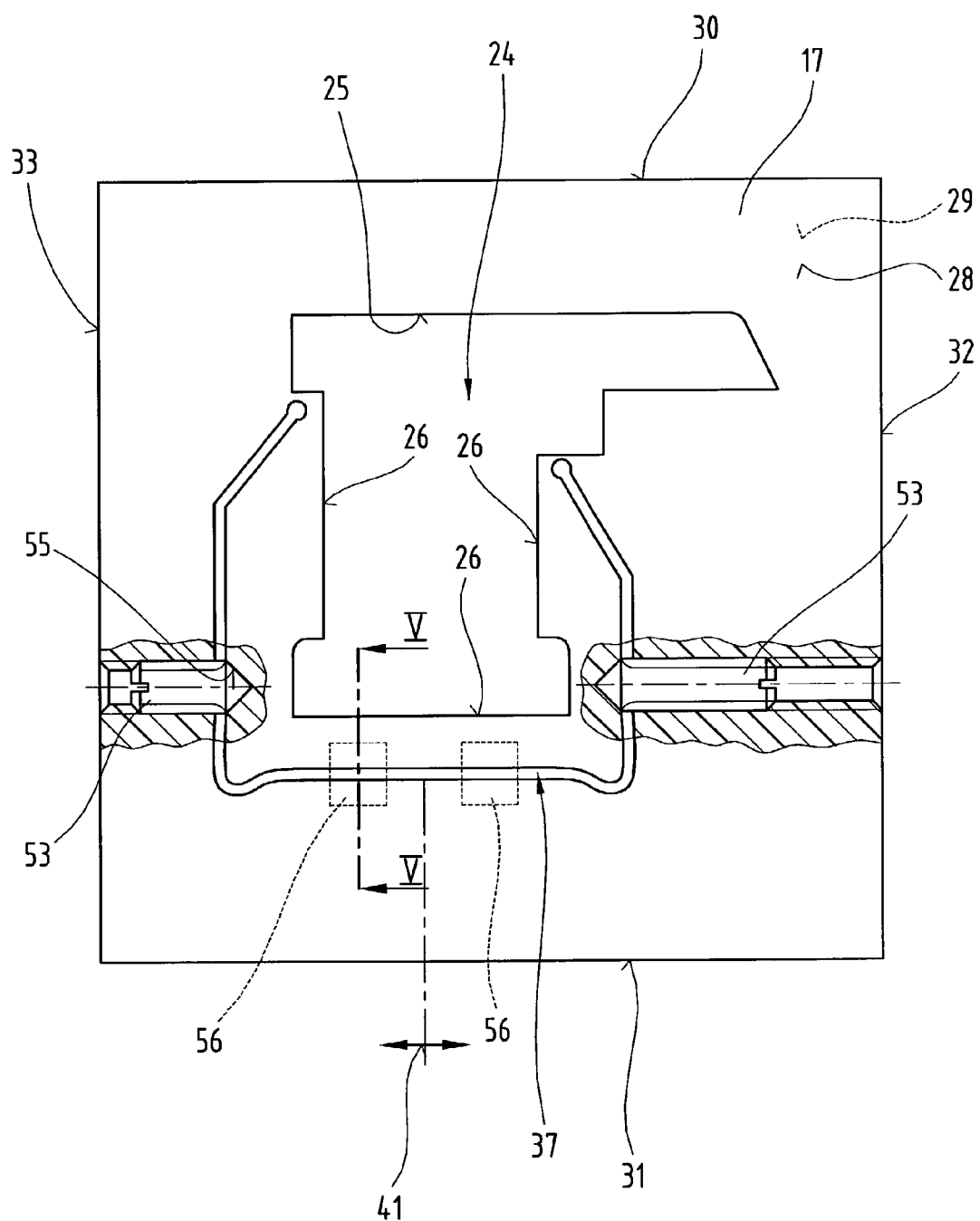
FIG. 4 is a simplified, schematic diagram showing an end-on view of another possible design of the calibration die and co-operating positioning elements.
Figure 5:
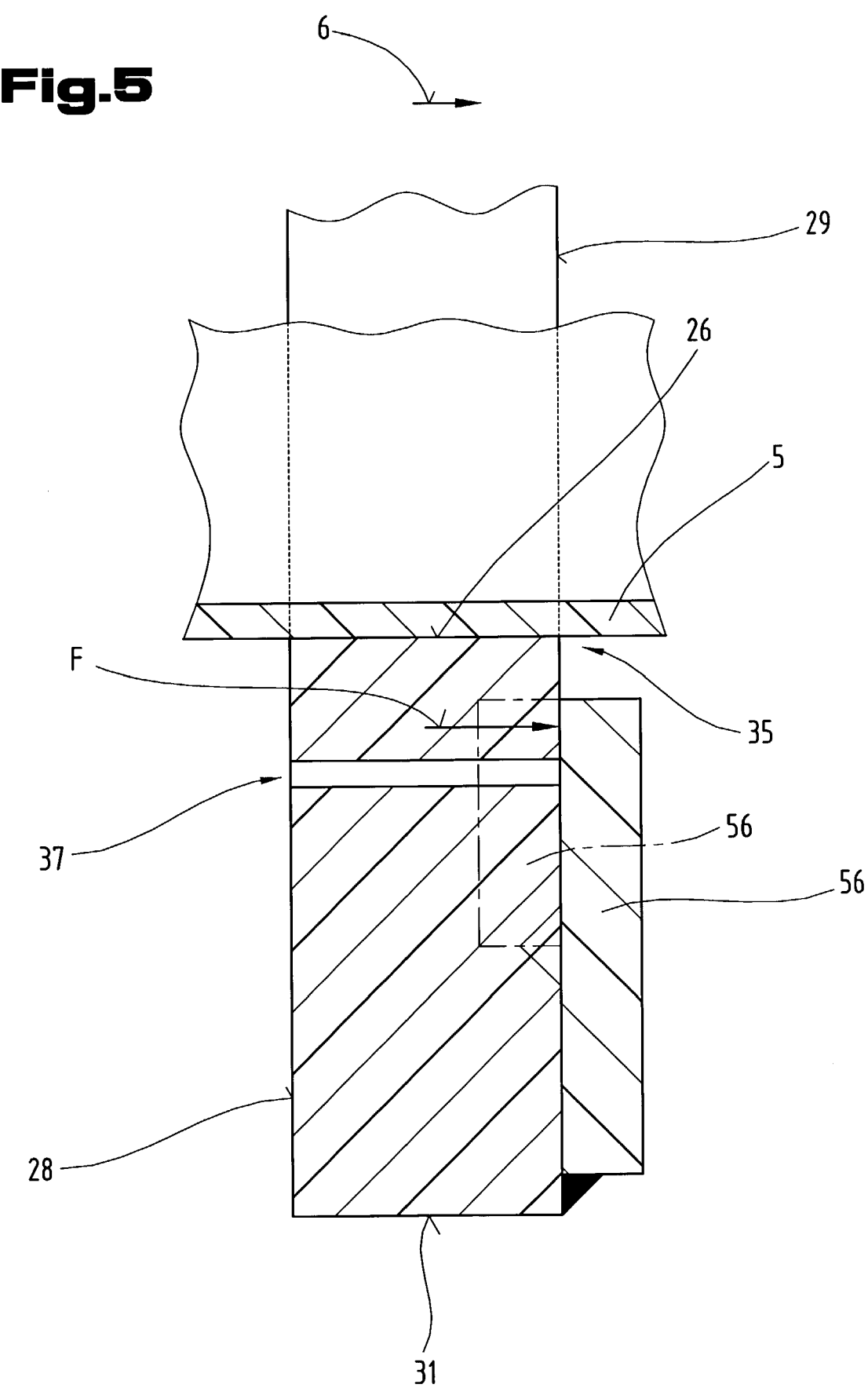
FIG. 5 is a simplified diagram, on an enlarged scale, showing a side view of a part-region of the calibration die, seen along line V—V indicated in FIG. 4.

FIGS. 4 and 5 illustrate another possible arrangement of positioning elements 53, where for the sake of simplicity only a single gap 37 is provided for the calibration orifice 24. For the sake of avoiding unnecessary repetition, reference may be made to the description given with regard to FIGS. 1 to 3 above for details of the same parts shown by the same reference numbers. Likewise, the insert 51 will not be described, although it could naturally also be used with this embodiment.

With a view to re-positioning the shaping surfaces 26 relative to the stationary shaping surface 25 of the calibration die 17 described above, the embodiment described as an example here is provided with at least one positioning element 53, but preferably two positioning elements 53, which are disposed in the region starting from the side faces 32 or 33 in the direction of the calibration orifice 24 in the calibration die 17. These positioning elements 53 are preferably provided in the form of adjusting screws, which are usually aligned in a direction perpendicular to the gap 37, bridging the latter.

If, for example, only one of the positioning elements 53 is provided, it will only be possible to shift the shaping surfaces 26 in one direction—indicated by double arrow 41. In order to restrict the displacement path, a spacing element can be introduced, in order to limit any shifting, for example in the gap 37 lying opposite the positioning element 53, which becomes smaller as the shift progresses, provided it has an exactly pre-definable gap width 39, and the gap 37 will be reduced by means of the positioning element until the gap walls bounding the gap 37 move into abutment on the spacing element, thereby producing an exact dimensional re-positioning of the shaping surfaces 26. This spacing element is not illustrated in detail here but may be provided in the form of a strip-shaped element, for example, with an exact thickness, adjustment-capacity, etc., which an be removed after the position has been fixed. However, if designed accordingly, these spacing elements could be left in the gap 37, 38 as a stop restriction, without the risk of inadvertently working loose. The fixed or, if necessary, releasable means for defining the position relative to the stationary parts of the calibration die 17 may again be achieved by means of the fixing devices described above, for example.

Irrespective of the above, it would also be possible to use a wedge as the positioning element 53, inserted in the gap, in combination with the spacing element described above, to re-position the shaping surfaces 26 with the part-regions of the calibration die 17 assigned to them. However, another option would be to use positioning elements with splining co-operating with oppositely lying gap surfaces and achieve a relative displacement of the shaping surfaces to be re-positioned by a judicious selection of the spline angle. The newly adjusted position can then be fixed by any of the means described above.

On the other hand, an effective adjustability can be achieved if a positioning element 53 is provided for each of the mutually opposite shaping surfaces 26 to be adjusted so that the desired adjustment can be made to the shaping surfaces 26, as indicated by double arrow 41, depending on the insertion depth or displacement path of the positioning element. If the positioning element 53 has a plane aligned substantially parallel with the gap surface at the end co-operating with the gap surface, it will be possible for pressure to be applied in a planar arrangement.

However, if a recess 55 is provided in the gap surface lying closer to the shaping surface 26, disposed so that the positioning element 53 can be inserted in it, and if the positioning element 53 has a virtually matching three-dimensional shape at its end region, the portion of the calibration die 17 which is displaceable will also be supported in the extrusion direction 6. Consequently, in addition to the shifting motion, a force acting in the direction perpendicular to the inlet and outlet faces 28, 29 can also be supported by the positioning elements 53.

However, as illustrated on a larger scale in FIG. 5, it would also be possible to provide the gap 37 with at least one supporting element 56, projecting in the direction towards the shaping surface 26, in the region of the second outlet face 29 in the extrusion direction 6, in other words on the outlet face 29 constituting the outlet region 35. This supporting element 56 will then be fixedly retained on the stationary portions of the calibration die 17 by reference to the portions thereof that are displaceable, such as by means of a welded connection, screw connection, rivet connection and various other possible means, for example. The essential point, however, is that the forces acting on the object 5 as it is fed through can be transmitted from the portion of the calibration die 17 in the extrusion direction 6—indicated by arrow F—to the support element 56. The number of support elements 56, their layout and their design will depend on the prevailing forces, the shape of the calibration orifice 24 and optionally the flow of coolant fed through the interior of the vacuum pressure tanks 14 to 16.

However, the support element 56 could also be recessed in the outlet face 29, in which case a planar surface would be obtained in the region of the outlet face 29. This is schematically indicated by dotted-dashed lines.

The calibration die 17 is made as a single component, at least in the region of the shaping surfaces 26 to be adjusted, in particular a plate, to enable part-portions of the calibration orifice 24 incorporating the shaping surfaces 26 to be displaced relative to the stationary shaping surfaces 25 or stationary portions of the calibration die 17.

Figure 6:
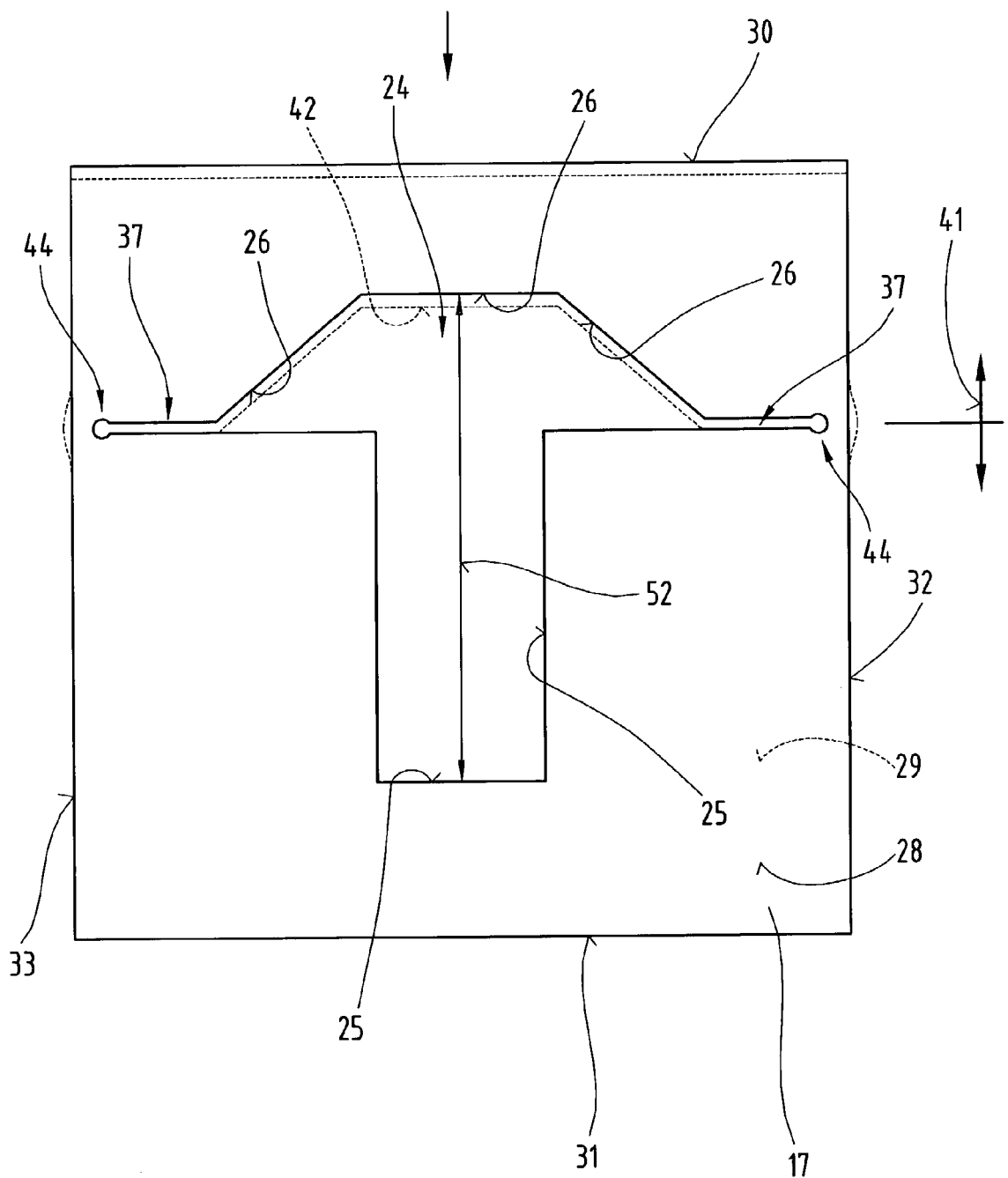
FIG. 6 is a simplified, schematic diagram showing an end-on view of another embodiment of the calibration die.

FIG. 6 illustrates another embodiment of a calibration die 17, which may be construed as an independent solution in its own right, having a calibration orifice 24, this being merely an example, the same reference numbers being used again for the same parts as those described with reference to FIGS. 1 to 5 above.

The calibration die 17 in this example of an embodiment is made up of an integral component, at least in the region of the shaping surfaces 26 to be re-positioned, and is fixed in terms of its three-dimensional shape, as viewed in the extrusion direction, by the inlet and outlet faces 28, 29 and the side faces 30 to 33 extending in between. The calibration orifice 24 illustrated in this instance is bounded by the stationary shaping surfaces 25 and shaping surfaces 26 which are displaceable relative thereto. In order to vary the distance 52 between the stationary shaping surface 25 and the shaping surface 26 to be re-positioned, at least one respective gap 37 is provided, in this instance starting from at least two shaping surfaces 26, in the direction towards one of the side faces 30 to 33.

In the embodiment illustrated as an example here, the gap 37 extends from the T-shaped ends of the calibration orifice 24 in the direction towards the respective oppositely lying side faces 32, 33. The starting point 44 of the gap 37 is disposed adjacent to the side faces 32, 33 and terminates in the calibration orifice 24, so that when an adjusting force is applied as schematically indicated by the arrow, the material of the calibration die 17 deforms in the peripheral region thereof, thereby enabling the position and hence the associated distance 52 between the displaceable shaping surface 26 and the stationary shaping surface 25 to be varied, so that the periphery of the calibration orifice 24 is delimited by the shifted shaping surfaces 42 indicated by broken lines and the stationary shaping surfaces 25. In order to shorten and/or lengthen the distance 52, the layout and the number of the gaps 37 maybe selectively varied depending on the cross-sectional shape of the calibration orifice 24.

In the case of the shortening illustrated here as well as in the lengthening of the distance 52 (see FIG. 2)—indicated by double arrow 41—between the shaping surfaces 25, 26, the gaps 37 are disposed in an oppositely lying arrangement by reference to the calibration orifice 24 and in the same plane. In the case of a calibration orifice 24 of a different cross-sectional shape, the gaps 37 could be disposed in an oppositely lying arrangement by reference to the calibration orifice 24 but offset from one another, for example.

The fixing device, which may be releasable if necessary, between the portion of the calibration die 17 to be adjusted and the fixed portion may be selected in the same way as described with reference to the embodiments above. Provided the material between the starting point 44 and the side faces 30 to 33 associated with it is strong enough, the releasable fixing device may be dispensed with, as necessary.

Figure 7:
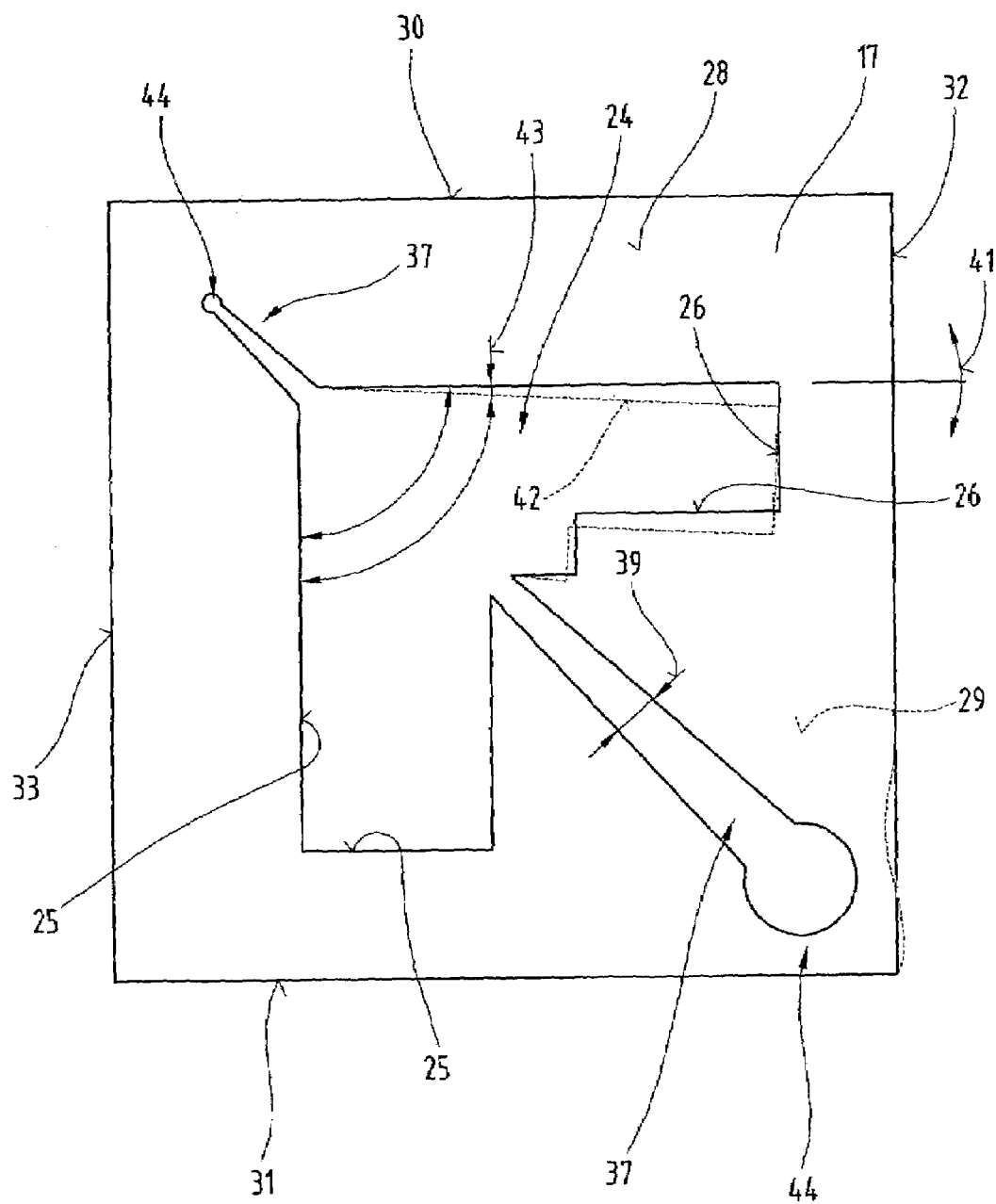
FIG. 7 is an end-ion view of another possible embodiment of the calibration die proposed by the invention.

FIG. 7 provides an illustration of another embodiment of the calibration die 17, which may be construed as an independent solution in its own right, in which a calibration orifice 24 is again provided with shaping surfaces 25, 26. Again, the same reference numbers are used to denote parts that are the same as those described with respect to FIGS. 1 to 6 above.

This calibration die 17 again has inlet and outlet faces 28 and 29 disposed one after the other in the direction of extrusion and side faces 30 to 33 extending in between. The cross-section of the calibration orifice 24 in this case is substantially L-shaped, and the intention is to produce an angular adjustment of the shaping surfaces 26 lying closer to the side faces 30 respectively 32 than the other shaping surfaces 25. To this end, a respective gap 37 is provided substantially on the diagonal of the L-shaped calibration orifice 24 on either side thereof, which extends as far as the starting points 44 in the transition region between the side faces 30 and 33 as well as 31 and 32. The gaps extend as far as the calibration orifice and therefore communicate with it.

The shaping surface 25 lying closer to the side faces 33 is the stationary shaping surface 25 in this instance. The displaceable shaping surface 26 lying closer to the side face 30 subtends a right-angle with the latter prior to re-positioning, which in this case can be effected in both of the directions indicated by the double arrow 41. The shifted contour of the calibration orifice 24 in the region of the calibration die 17 that is displaced is schematically indicated by the shaping surfaces 42 shown in broken lines and is in fact grossly exaggerated. The re-positioned shaping surface 42 subtends an angle with the stationary shaping surface 25 that is smaller than the right-angle, by an amount which can be calculated on the basis of the difference between the initial angle and the displacement angle 43.

Depending on the desired adjustment to the shaping surfaces 26, it would be possible to produce a shift in the other direction, in which case the displaced shaping surface 42 would subtend a larger angle with the stationary shaping surface 25 than it did before the adjustment.

Depending on the degree of adjustment, it may be of advantage in the case where the reference angle of the gap 37 is reduced, for the gap width 39 to increase constantly, starting from the region at the top left-hand side, in this instance, in the direction towards the diagonally opposite region, at the bottom right-hand side in this instance. Irrespective of the above, however, it would also be possible for one of the two gaps 37 to be provided with an exactly pre-definable gap width 39 prior to displacement and to use an appropriate spacing element inserted in the reducing gap 37 as a means of obtaining the adjustment, in which case it would be possible to pre-define the displacement angle 43 exactly. A fixing element may be provided and may be releasable if necessary. Likewise, although not illustrated in this drawing, it would also be possible to provide at least one, but preferably several support elements 56 and inserts 51.

In the embodiment selected as an example here, the region surrounding the starting point 44, which is shown at the top left-hand side in this instance, between the latter and the side faces 30, respectively 33 immediately adjacent to it, serves as the basis for the pivoting region. In the region of the other, oppositely lying starting point 44, a deformation which might occur is shown in broken lines, albeit it grossly exaggerated, and in the event of a plastic deformation in this region it will be possible to dispense with the fixing means. For reasons pertaining to stability and strength and with a view to reducing or preventing vibrations, however, it may be expedient to provide one nevertheless.

As mentioned briefly above, the moulding system 3 for the extrusion plant 1 may be made up of several calibration tools 9 to 13, and these may also be made up of individual calibration dies 17 disposed one after the other, as illustrated in a simplified format in the case of the calibration tool 13 shown in FIG. 1. Accordingly the disposition of the gaps 37, 38 is not just restricted to the calibration dies 17 in the vacuum pressure tanks 14 to 16 as described above and in practice these gaps 37, 38 may also be provided in a similar arrangement in the individual calibration tools 9 to 13 as a means of correcting the geometry of the section.

However, the calibrations tools need not necessarily be of the plate-type assembly of individual calibration dies 17 described above and it would also be possible to incorporate the gaps 37, 38 throughout the entire length of the calibration block, including in the dry calibration region, since the adjusting motion and the associated adjustment is dependent only on the adjusting force applied.

If the calibration tools are of a longer design in the extrusion direction, for example in the order of between 150 mm and 500 mm, several different positioning elements 56 designed to apply the requisite adjusting force may be provided across the longitudinal extension of the gap through the calibration tool 9 to 13, so that the adjusting force for producing the relevant displacement path for the desired correction to the section can also be applied at the requisite points.

Figure 8:
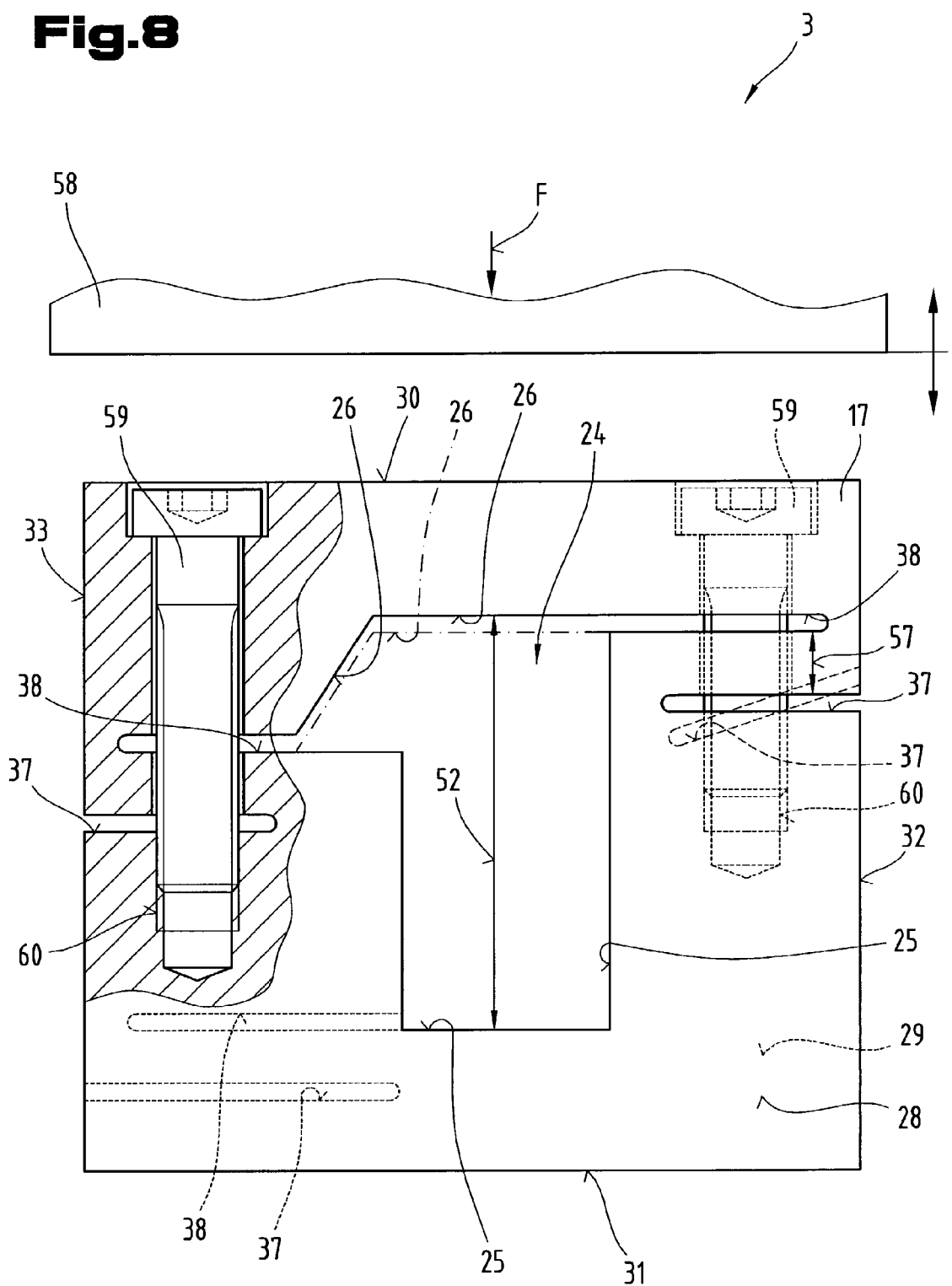
FIG. 8 is a simplified diagram in partial section, showing another embodiment of the calibration die.

FIG. 8 shows another possible embodiment of the calibration die 17 which may be used to set up a moulding system 3 and which may also be construed as an independent embodiment in its own right, the same reference numbers being used to denote parts that are the same as the components described with reference to FIGS. 1 to 7 above. To avoid unnecessary repetition, reference should be made to the detailed description given with reference to FIGS. 1 to 7 above.

The calibration die 17 illustrated here also has an inlet face 28 directed towards an object 5, not illustrated, to be fed through it, and an outlet face 29 spaced at a distance apart from it, with side faces 30 to 33 extending in between. These individual faces define the three dimensional shape of the calibration die 17.

The calibration orifice 24 with its shaping surfaces 25, 26 extends through the calibration die 17 between the inlet face 28 and the outlet face 29 and—as explained above—is used to support at least individual external surfaces of the object 5 against the shaping surfaces 25, 26, defining the shape imparted to the object 5 fed through.

Again in this embodiment, the shaping surfaces that are stationary are denoted by reference 25 and the shaping surfaces that a displaceable relative thereto are denoted by reference 26.

It should also be pointed out that the calibration orifice 24 illustrated is but one example selected from a plurality of possible cross-sectional shapes and naturally can be adapted to match the contours of the object 5 to be calibrated. The particular calibration orifice 24 illustrated in this instance is of a substantially L-shaped design. Starting from the shaping surfaces 26 to be displaced—which in this case are the shaping surfaces 26 directed towards the side faces 30 and 33, for example, and forming the shorter leg of the L-shaped cross-section—a respective gap 38 extends in the direction towards the side face 32 illustrated on the right-hand side in this instance and towards the other side face 33 shown on the left-hand side. Also starting from these two side faces 32, 33 and immediately adjacent to the gap 38 is another respective gap 37, extending in the direction towards the calibration orifice 24. Accordingly, the two associated gaps 37, 38, which co-operate with one another for adjustment purposes, extend substantially parallel with one another and are arranged at a distance 57 apart from one another. The individual gaps 37, 38 therefore run substantially at a right-angle relative to the inlet face 28 and outlet face 29 and extend between them. Irrespective of the above, however, it would also be possible for the gaps 37, 38 extending between the inlet face 28 and outlet face 29 to be disposed at a right-angle relative to the inlet face 28 and outlet face 29 but inclined at an angle in the calibration die 17, as illustrated by broken lines in the right-hand part of the calibration die 17.

The purpose of the two co-operating gaps 37, 38, which in this instance are arranged on either side of the calibration orifice 24 is—as explained above with reference to FIG. 6—to vary the distance 52 between the shaping surface 25 directed in this instance towards the side face 31 shown at the bottom and the shaping surface 26 which in this instance is directed to the side face 30 illustrated at the top, as schematically indicated by the broken lines in the region of the shaping surfaces 26 to be adjusted. Accordingly, the deformation in the material of the calibration die 17 between the co-operating gaps 37, 38 may lie either in the elastic and/or plastic region. For example, the shaping surfaces 26 may be adjusted in a predefined manner to vary the distance 52 by a schematically illustrated press 58 applying force as indicated by arrow F, as a result of which the shaping surfaces 26 to be adjusted are changed to the position indicated by broken lines, for example. Depending on the extent of the adjustment path and the layout of the gaps 37, 38 relative to one another, a permanent plastic or alternatively an elastic deformation can be produced.

If it is desirable to deform the material of the calibration die 17 in the region of the respectively co-operating gaps 37, 38, the displacement of the shaping surfaces 26 relative to the stationary shaping surfaces 25 may also be achieved by one or more positioning elements 59, for example, assigned to the individual co-operating gaps 37, 38. In the embodiment illustrated as an example here, the positioning elements 59 are provided in the form of screws, for example, which extend inside the calibration die 17, from the side face 30 associated with the shaping surfaces 26 to be adjusted, in the direction towards the side face 31 lying opposite. Accordingly, a thread arrangement 60 is provided on the side of the gap 37—in other words the gap extending from the side face 32, respectively 33 in the direction towards the calibration orifice 24—directed towards the side face 31. Consequently, by turning the screw, the part-region of the calibration die 17 associated with the shaping surfaces 26 to be adjusted can be adjusted by reducing the respectively co-operating gaps 37, 38 as necessary. Depending on the displacement path, the individual positioning elements 59—in the particular embodiment illustrated here two positioning elements 59—can be used to effect a parallel adjustment or displacement of the shaping surfaces 26, for example. If, on the other hand, the mutually co-operating gaps 37, 38 are deformed or varied in a different manner from one another, an angular adjustment can also be made to the shaping surfaces 26 to be adjusted, for example. However, it would also be possible to achieve this by means of the mutually co-operating gaps 37, 38 indicated by broken lines in the bottom left-hand corner of the calibration die 17 by arranging the positioning elements 59 accordingly. In the case of an angular adjustment, it may be sufficient to provide only one of the gaps 37, 38 in the region of calibration die 17 forming the rotation or pivot point for displacing the shaping surfaces 26, in which case the angular displacement and hence the pivot or rotation point for the displacement of the shaping surfaces 26 can be readily fixed on the basis of the layout and orientation of the gap 37 and/or 38.

The embodiments of the calibration die 17 described in FIGS. 2 to 8 described above may be used within the entire shaping device 3 and may be used to set up the calibration tools 10 to 13 and/or used as a calibration or supporting die inside the vacuum pressure tanks 14 to 16.

As briefly explained above, remotely operable displacement means may be provided for the shaping surfaces to be re-positioned or adjusted, by means of which a semi-automated or fully automated change in position can be made relative to the stationary shaping surfaces 25. For example, with a pre-defined gap width 39 of the gaps 37, 38, a computer simulation can be used in order to determine the nature of the gap and a conclusion obtained in a subsequent sequence as to the ultimate section geometry obtained. If it transpires that the actual geometry is at variance with the desired geometry, the semi-automated or fully automated position-changing process can then be used to adjust the position of the displaceable shaping surfaces 26 during the ongoing extrusion process. To this end, length-adjustable elements may be inserted in the gaps 37, 38, enabling the control and regulating device to be controlled accordingly, so that they will adjust the gap width and hence the associated change in the position of the shaping surfaces 26.

The section contour can be automatically monitored in the region of the lengthening device, in a manner generally known from the prior art, for example. As a result, the exact actual section geometry can be compared with the desired section geometry by using an appropriate computer simulation and if variances are detected, the positioning elements can be immediately activated by a control and activation circuit to change the position of the shaping surfaces 26 by varying the gap width 39 of the gaps 37, 38.

Values of distortions which occur in section geometries known from past experience will provide a basis for selecting the layout of the gaps 37, 38 in the calibration dies 17 accordingly, already offering a possible adjustment by a certain degree, without the extra effort of the subsequent processing that is usually needed in the region of the calibration orifice 24. Consequently, the resultant section geometry can be rapidly brought to the desired geometry during the course of the extrusion process without lengthy down times and a large amount of subsequent processing work.

The possibility described here whereby an adjustment can be made during the extrusion operation may naturally also be operated in the region of the so-called calibration tools, in particular the dry calibration dies, in order to render the section geometry to be produced as close as possible or identical to the desired section geometry in these regions. This being the case, for example, several of the calibration dies 17 may be assigned to a common adjusting system in order to change the position of individual shaping surfaces 26 so that a simultaneous and above all joint adjustment or change in position can be operated. This adjusting system may be provided in the form of an eccentric adjusting system, for example.

Irrespective of the above, however, it would also be possible to use the individual gaps as a means of feeding another coolant through the system, to enable heat to be dispelled rapidly from the object as it is fed through the individual calibration dies 17 disposed one after the other, for example, in the region of the calibration tools and through the displaceable shaping surfaces 26 co-operating with the gap 37, 38. Accordingly, a longitudinal passage may be provided within the calibration tool, for example, which merely has to be connected to corresponding delivery and discharge lines in order to deliver and discharge the coolant accordingly. This provides an extra feature in addition to obtaining the relative angular re-positioning of the shaping surfaces 26 in the region of the cooling system, and an appropriate layout will provide a reliable means of ensuring that the coolant introduced through the gaps 37, 38 is not able to penetrate as far as the external surface of the object.

For the sake of good order, it should be pointed out that in order to provide a clearer understanding of the structure of the calibration die 17 with the gap disposed in it as well as the methods used for position-changing and retaining purposes, it and its component parts are illustrated to a certain degree out of scale and/or on an enlarged scale and/or on a reduced scale.

The underlying objective of the independent solutions proposed by the invention may be taken from the description.

Above all, the individual embodiments illustrated in FIGS. 1; 2, 3; 4, 5; 6; 7; 8 may be construed as independent solutions proposed by the invention. The related objectives and the solutions proposed by the invention may be found in the detailed descriptions of these drawings.

LIST OF REFERENCE NUMBERS

1 Extrusion plant
2 Extruder
3 Moulding system
4 Crawler off-take
5 Object
6 Extrusion direction
7 Extrusion tool
8 Calibrating device
9 Calibration tool
10 Calibration tool
11 Calibration tool
12 Calibration tool
13 Calibration tool
14 Vacuum pressure tank
15 Vacuum pressure tank
16 Vacuum pressure tank
17 Calibration die
18 Container
19 Machine bed
20 Standing surface
21 Calibrating table
22 Roller
23 Track
24 Calibration orifice
25 Shaping surface
26 Shaping surface
27 Profiled cross-section
28 Inlet face
29 Outlet face
30 Side face
31 Side face
32 Side face
33 Side face
34 Inlet region
35 Outlet region
36 Thickness
37 Gap
38 Gap
39 Gap width
40 Longitudinal course
41 Double arrow
42 Shaping surface
43 Displacement angle
44 Starting point
45 Part-region
46 Part-region
47 Part-region
48 Connecting region
49 Distance
50 Receiving orifice
51 Insert
52 Distance
53 Positioning element
54 Shaping surface
55 Recess
56 Supporting element
57 Distance
58 Press
59 Positioning element
60 Thread arrangement

What is claimed is:

1. A molding system for an extrusion plant, comprising a calibration die which has inlet and outlet faces spaced at a distance apart from each other and side faces extending therebetween, a calibration orifice extending between the inlet and outlet faces of the calibration die and bounded by interconnected shaping surfaces including at least one displaceable and one stationary shaping surface, the displaceable shaping surface having three interconnected parts extending at an angle to each other, the shaping surfaces enclosing an external profiled section of an object fed through the calibration orifice from the inlet face to the outlet face, and at least one gap within the calibration die and extending over the distance between the inlet and outlet faces, the gap having three interconnected parts extending in a plane parallel to the inlet and outlet faces and forming a substantially U-shaped gap, the gap being disposed adjacent interconnected parts of a respective one of the displaceable shaping surfaces for enabling said interconnected displaceable shaping surface parts to be repositioned together relative to a respective one of the stationary shaping surfaces.

2. The molding system of claim 1, wherein the gap extends continuously about the adjacent interconnected parts of the displaceable shaping surface to be repositioned, with at least a portion of the gap extending between said displaceable shaping surface parts and one of the side walls.

3. The molding system of claim 1, wherein the gap has a width between 0.1 mm and 15 mm in a direction parallel to the inlet and outlet faces.

4. The molding system of claim 1, comprising means for retaining the repositioned displaceable shaping surface parts.

5. The molding system of claim 1, comprising a supporting element arranged in the region of the outlet face and projecting beyond the gap towards the displaceable shaping surface.

6. The molding system of claim 5, wherein the supporting element is recessed in the outlet face.

7. The molding system of claim 1, comprising a positioning element extending from one of the side faces in the direction of, and bridging, the gap.

8. The molding system of claim 7, wherein the positioning element extends in a perpendicular direction to the gap.

9. The molding system of claim 7, wherein respective ones of the positioning elements extend from opposite ones of the side faces in the direction of, and bridging, opposite parts of the gap.

10. The molding system of claim 7, wherein a wall of the gap close to the displaceable shaping surface has a recess receiving the positioning element.

11. The molding system of claim 10, wherein the recess and the positioning element have a complementary three-dimensional shape.

12. The molding system of claim 1, wherein the gap has a predetermined width in directions parallel and perpendicular to the inlet and outlet faces, comprising a spacing element for limiting the repositioning of the displaceable shaping surface parts.

13. The molding system of claim 1, wherein the interconnected shaping surface and gap parts are spaced from each other by a constant distance.

14. The molding system of claim 1, wherein the interconnected shaping surface and gap parts are spaced from each other by a varying distance.

15. The molding system of claim 1, wherein the gap starts at a point close to one of the side faces.

16. A molding system for an extrusion plant, comprising a calibration die which has inlet and outlet faces spaced at a distance apart from each other and side faces extending therebetween, a calibration office extending between the inlet and outlet faces of the calibration die and bounded by interconnected shaping surfaces including at least one displaceable and one stationary shaping surface, the shaping surfaces enclosing an external profiled section of an object fed through the calibration office from the inlet face to the outlet face, and at least one gap within the calibration die and extending over the distance between the inlet and outlet faces, the gap being disposed adjacent interconnected parts of a respective one of the displaceable shaping surfaces for enabling said interconnected displaceable shaping surface parts to be repositioned together relative to a respective one of the stationary shaping surfaces, the displaceable shaping surface having two of said interconnected parts, a respective one of the gaps extending from each displaceable shaping surface part towards a respective one of the side faces, and the gaps extending in opposite directions from the calibration office.

17. The molding system of claim 16, wherein the gaps have a width increasing towards the side faces.

18. The molding system of claim 16, wherein the gaps are arranged in the same plane.

19. The molding system of claim 16, comprising further gaps associated with each one of the gaps and extending from the side faces towards the calibration office.

20. A molding system for an extrusion plant, comprising a calibration die which has inlet and outlet faces spaced at a distance apart from each other and side faces extending therebetween, a calibration office extending between the inlet and outlet faces of the calibration die and bounded by interconnected shaping surfaces including at least one displaceable and one stationary shaping surface, the shaping surfaces enclosing an external profiled section of an object fed through the calibration office from the inlet face to the outlet face, and at least one gap within the calibration die and extending over the distance between the inlet and outlet faces, the gap being disposed adjacent interconnected parts of a respective one of the displaceable shaping surfaces for enabling said interconnected displaceable shaping surface parts to be repositioned together relative to a respective one of the stationary shaping surfaces, and the shaping surfaces having a recessed receiving opening, comprising a wear-resistant insert placed in the receiving opening and projecting into the calibration office.

21. The molding system of claim 16, wherein the gap has a width between 0.1 mm and 15 mm in a direction parallel to the inlet and outlet faces.

22. The molding system of claim 16, comprising means for retaining the repositioned displaceable shaping surface parts.

23. The molding system of claim 16, comprising a supporting element arranged in the region of the outlet face and projecting beyond the gap towards the displaceable shaping surface.

24. The molding system of claim 23, wherein the supporting element is recessed in the outlet face.

25. The molding system of claim 16, comprising a positioning element extending from one of the side faces in the direction of, and bridging, the gap.

26. The molding system of claim 25, wherein the positioning element extends in a perpendicular direction to the gap.

27. The molding system of claim 25, wherein respective ones of the positioning elements extend from opposite ones of the side faces in the direction of, and bridging, opposite parts of the gap.

28. The molding system of claim 25, wherein a wall of the gap close to the displaceable shaping surface has a recess receiving the positioning element.

29. The molding system of claim 28, wherein the recess and the positioning element have a complementary three-dimensional shape.

30. The molding system of claim 16, wherein the gap has a predetermined width in directions parallel and perpendicular to the inlet and outlet faces, comprising a spacing element for limiting the repositioning of the displaceable shaping surface parts.

* * * * *